April 9, 1935.  J. DE LA CIERVA  1,996,750
AUTOROTATIVE WING AIRCRAFT
Original Filed May 31, 1932   3 Sheets-Sheet 3
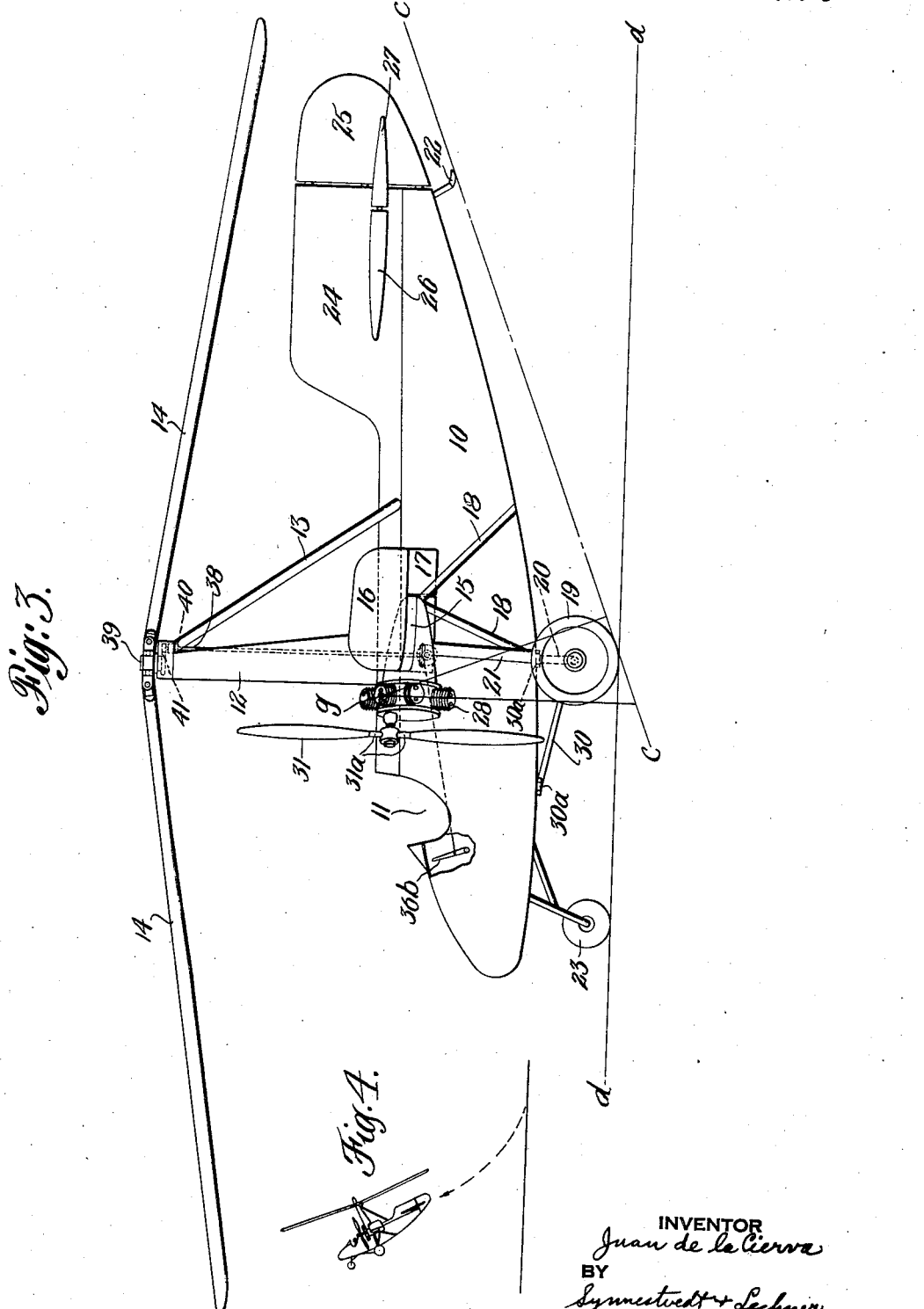

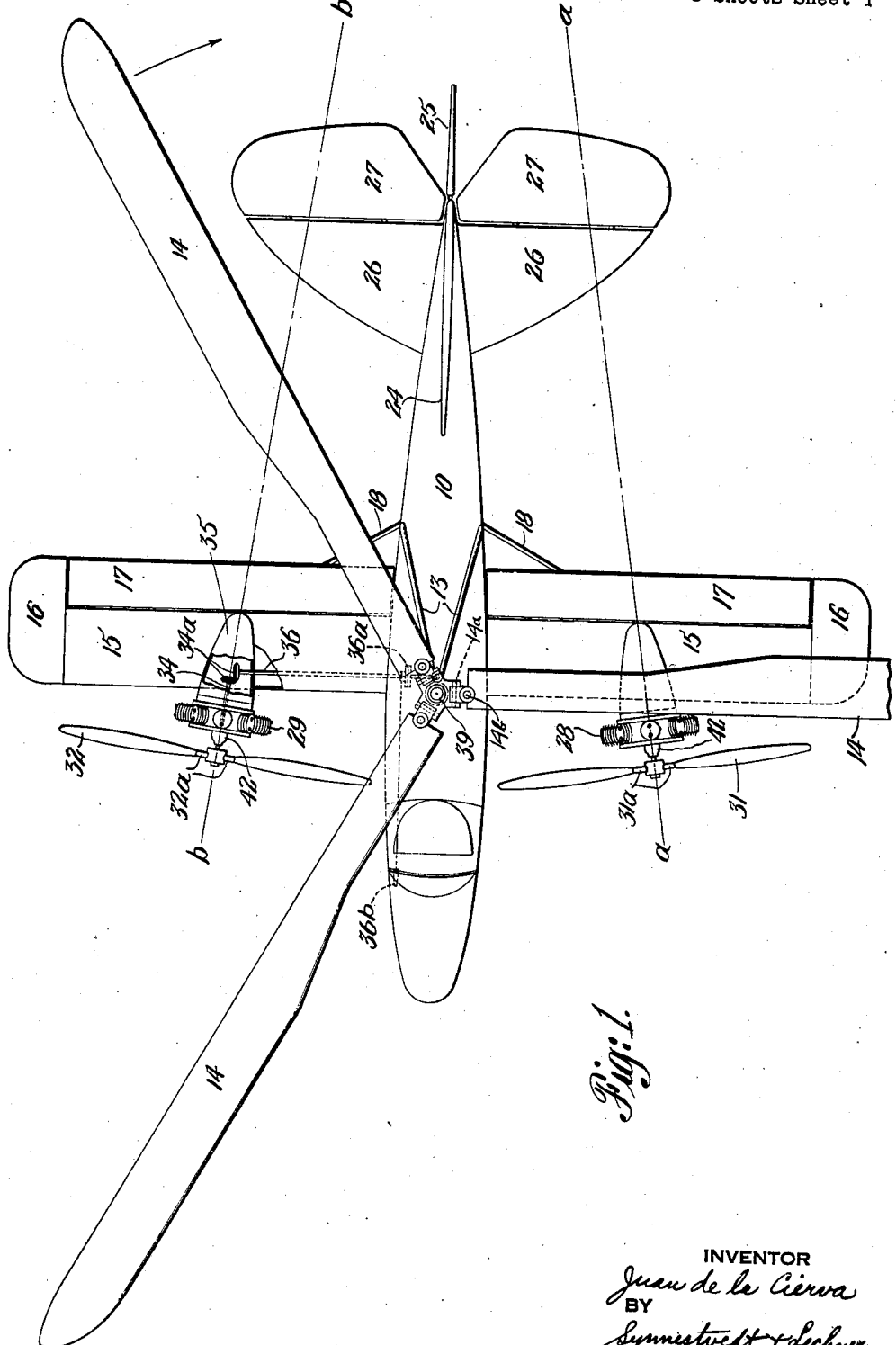

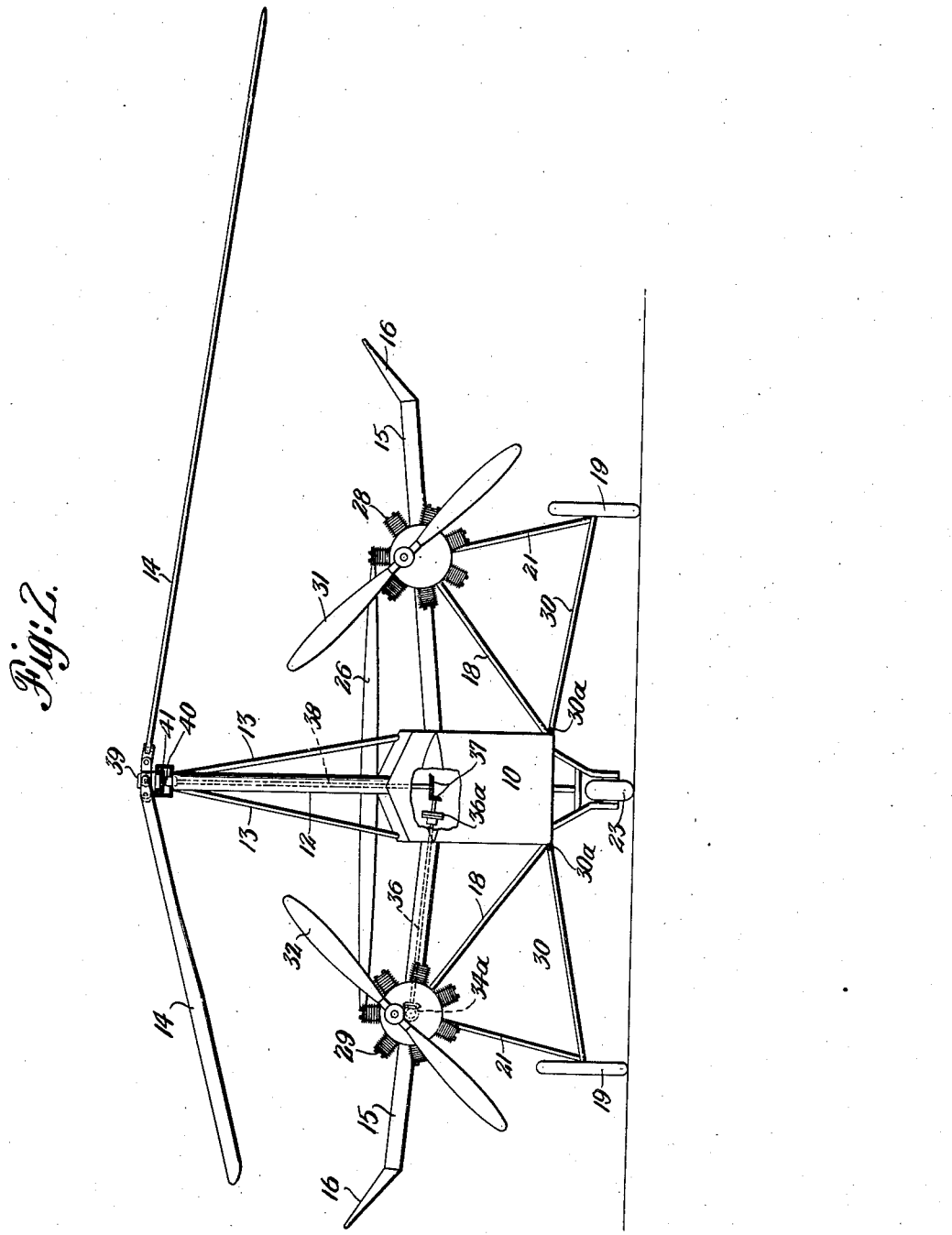

Patented Apr. 9, 1935

1,996,750

UNITED STATES PATENT OFFICE 1,996,750

AUTOROTATIVE WING AIRCRAFT

Juan de la Cierva, Madrid, Spain, assignor to Autogiro Company of America, Philadelphia, Pa., a corporation of Delaware Application May 31, 1932, Serial No. 614,476. Renewed June 26, 1934. In Great Britain June 12, 1931

22 Claims. (Cl. 244—19)

The present invention relates to aircraft of the type in which the main duty of sustentation is performed by a "rotor" comprising a plurality of wings or blades articulated (preferably independently) to a central hub, which is mounted for free rotation about a substantially vertical axis when the aircraft is on an even keel, the rotor being rotated in flight by relative air flow due to forward and/or downward translation of the aircraft. The independent articulations of the blades are preferably arranged to permit individual swinging movement of the said blades in planes perpendicular to the mean plane of rotation of the blades and preferably also in the general path of rotation.

It is a characteristic of aircraft of this type that they are capable of stable flight at very low forward speeds, but the useful minimum forward speed has hitherto been limited by thrust power developed by the airscrew, in that at forward speeds less than the said useful minimum the aircraft will be unable to fly without loss of height owing to the insufficiency of that power.

However, if a power plant be installed capable of developing a much greater thrust power per unit of total load of the aircraft than hitherto usual, I have found that an aircraft of the type referred to may be made capabe of sustained stable flight without loss of height and even with a good rate of climb at forward speeds which are vanishingly small. Stated another way, such a craft may assume a steep angle and maintain or gain altitude by the high thrust power of its airscrew. Such an aircraft shows great advantage in ability to take off and climb out of a restricted space, more especially if it is provided with means of initially starting the rotor from rest. Such a starting means may take the form of a disconnectible torque-imparting device (such as shown in my Patent No. 1,692,082, issued November 20, 1928), or an air-deflecting surface (such as shown in my Patent No. 1,857,807, issued May 10, 1932), or a suitable clutchable connection to the prime mover, or some other means.

In devising an aircraft of this type, however, certain difficulties arise. In the first place, to fly and climb at the lowest forward speeds, the aircraft itself must adopt a very large angle of incidence, with the result that a large proportion of the duty of sustentation of the aircraft against gravity falls on the propulsive airscrew, and the load carried by the air-actuated rotor is decreased by an amount equivalent to the upward component of the airscrew thrust. The effect of this is to decrease the rate of rotation of the rotor and if the aircraft be flown for some time at a very steep angle it would be possible for the rotor to stop altogether.

Further, at the very slow forward speeds and high climbing angles possible with such an aircraft, the controlling forces imposable thereon by means of the normal elevator, rudder and ailerons would be insufficiently powerful.

Finally, if the airscrew is designed to give the best thrust at very low forward speeds for the power applied to it, it will be incapable of absorbing the full power of the engine at the rated maximum revolutions when the aircraft is flying level and will moreover be of very low efficiency in this condition.

The primary object of the present invention is to provide an aircraft of the type referred to which is capable of very steep angles of climb and possibly even of vertical ascent, and in which all of the difficulties herein above mentioned are satisfactorily overcome, including the problem of preventing the rotor from unduly slowing down during steep climb when the propulsive airscrews are directly taking a large part of the load of sustension.

It has already been proposed in aircraft of the freely rotative wing type, to apply power to the rotor (from a main engine coupled to an air screw) to assist the rotation of the wings, as by means of gearing between the engine and the rotor hub, such gearing including preferably a free wheel device enabling the rotor to overrun the engine, and the gearing being arranged so that engine power is only applied to the rotor when its autorotational speed falls below a predetermined value (as in my Patent No. 1,673,232, issued June 12, 1928).

It has also been proposed to arrange the horizontal tail plane in an aircraft of this type so as to deflect the slipstream from the airscrew for the purpose of starting the rotor prior to take-off (as in my aforementioned Patent No. 1,857,807).

According to the present invention, however, I provide the aircraft not only with its normally wind-driven sustaining rotor of the type referred to, and its forward propelling means and auxiliary rotor driving means adapted to apply power from the propelling means to supplement the action of the wind in driving the rotor when the rotational speed of the rotor tends to fall below a predetermined minimum, but also I preferably provide at least two laterally positioned propulsive airscrews, one on either side of the craft, (preferably each having a separate engine), together with movable control surfaces comprising ailerons, elevators and rudders, the whole being so arranged that substantially every part of all control surfaces lies within the slipstream from one or other of the lateral airscrews.

If a single central vertical rudder is employed, the axes of the lateral airscrews are preferably arranged to converge rearwardly so as to direct the slipstreams onto the rudder. Alternatively paired rudders may be employed, located on either side of the central axis of the aircraft. The aircraft may conveniently be provided with small lateral fixed wings having the ailerons mounted on their trailing edges and the lateral airscrews are preferably mounted on the fixed wings approximately in front of the centre of each aileron. Thus, substantially the whole of the control surfaces of the aircraft lie within the slipstreams and enable adequate control to be maintained at very small or negligible forward speeds, as in a steep climb.

In the preferred constructional form each lateral airscrew is coupled to a separate engine, and according to a feature of the invention the auxiliary drive for the rotor is coupled to the engine driving the airscrew on that side of the aircraft on which the rotor blades are retreating or travelling contrary to the direction of motion of the whole aircraft, the engine driving the other lateral airscrew having no auxiliary rotor drive coupled thereto, so that the reaction torque on the aircraft of the auxiliary rotor drive is compensated by the excess of thrust of the airscrew whose engine has no extra load imposed by an auxiliary drive.

To provide sufficient thrust power for horizontal and climbing flight at very low forward speeds and to permit the use of the full available engine power for high speed flight, the airscrews employed are preferably of a type in which the pitch of the blades may be varied in flight, either by a manual control or automatically, from a very small pitch angle (giving maximum thrust at zero advance) up to the optimum angle for high speed flight or for cruising flight, whichever is the greater, (giving maximum efficiency and speed in forward flight). Among variable pitch propellers might be mentioned the 'Smith" and the "Universal". Large diameter propellers, geared-down from the crankshaft speed, may also be employed, and so located as to give ample clearance with respect to the rotor, as shown.

In order that the aircraft may adopt a position of large angle of incidence when taking off, a convenient form of construction according to this invention is provided with a somewhat tall undercarriage and a short tail skid, so as to give a large ground angle; and in order to enable the rotor to be easily stopped when there is a wind blowing, and to prevent the aircraft being unintentionally lifted off the ground by the wind, a forward wheel or wheels is or are also provided on which the aircraft can rest with the tail skid off the ground and the rotor axis substantially vertical.

In order to secure good directional trim, both when the engines are working and when gliding with engines throttled, the lateral airscrews may conveniently rotate in opposite directions, and to ensure against any tendency to swing uncontrollably if one lateral engine cuts out accidently a device may be incorporated whereby sudden accidental stoppage of one lateral engine causes the other lateral engine to be cut out or throttled down.

In order that the nature of this invention may be more fully understood one form of construction is described with reference to the accompanying drawings, of which:—

Figs. 1, 2 and 3 are three views of a general arrangement of the aircraft respectively in plan, front elevation and side elevation; and Fig. 4 is an outline view of the machine in a steep climbing attitude.

Referring to the drawings:—

The aircraft comprises a body 10 in which is arranged a pilot's cockpit 11. On the upper side of the body is arranged a rotor mounting pylon consisting of a hollow mast 12 and bracing struts 13, at the apex of which is arranged a three-bladed sustaining rotor 14, each blade of which has a horizontal pivot 14a and a vertical pivot 14b, permitting movements to compensate for varying flight forces. The rotor is arranged to rotate in the direction indicated by an arrow in Fig. 1. In Fig. 3, the blade at the near side has been omitted, for clarity. In Fig. 4, the three blades are indicated in the somewhat "coned" position of normal flight.

To either side of the body are secured auxiliary fixed wings 15 having upturned stabilizing tips 16 and carrying ailerons 17. The fixed wings are braced by struts 18. The aircraft is supported on the ground by means of main wheels 19, carried on axles 20 (Fig. 3) and sprung by means of telescopic shock-absorbing legs 21 whose upper ends are attached to the underside of the wings 15 near their middle points. The axles 20 are braced in a horizontal plane by radius rods 30 (Figs. 2 and 3), and said axles and rods are preferably secured by alined pivot devices 30a, to the body. The ground supporting gear of the aircraft also comprises a tail skid 22 and a forward wheel 23. On the rear of the body 10 are mounted a vertical fin 24, a movable rudder 25 and horizontal stabilizing surfaces 26 carrying elevators 27. Certain of the undercarriage elements which would appear in plan (Fig. 1) are omitted for the sake of clarity.

Lateral engines 28, 29 are mounted immediately in front of the auxiliary fixed wings 15, being secured to said fixed wings adjacent the junction of the members 18, 21 with the fixed wings. These lateral engines drive tractor airscrews 31, 32, and may include reduction gearing indicated at 42. The blades of the propellers or airscrews 31, 32, are each respectively mounted in the propeller hubs by a rotative root end 31a, 32a; the hub of each propeller having preferably automatic means for varying the propeller blade pitch setting, in accordance with thrust—such variable-pitch propellers being commercally available.

The axes of the engines and airscrews 28, 31 and 29, 32 are arranged to converge rearwardly, the axis lines being indicated at a—a, b—b. By this means the slipstreams from the airscrews are made to converge rearwardly so that the rudder 25 and the greater part of the fin 24 lie within such slipstreams. It will also be seen from inspection of Figs. 1 and 2 that the ailerons 17 lie almost entirely within the area of such slipstreams, as also do the horizontal stabilizing surfaces 26 and the elevators 27.

The crankshaft 34 of the engine 29 is coupled by means of bevel gearing 34a (housed within a casing 35) to a horizontal shaft 36 arranged within the thickness of the auxiliary wing 15. The shaft 36 drives, in turn, through any suitable clutch 36a and bevel or the like gearing 37, an upright shaft 38 which is housed within the hollow rotor supporting mast 12, the clutch 36a being engageable by a suitable control device 36b in the cockpit. The shaft 38 is connected with a rotor hub member 39 to which the blades 14 are attached. The drive transmitting means 34a, 36a, 37 and 38, comprise also an overrunning or free-wheel device and/or gearing, generally illustrated at 40 and 41, which may be housed at any convenient point of the system, as for instance immediately below or adjacent the rotor hub 39, the free-wheel device being so arranged that when the rotor exceeds a predetermined rotational speed, it overruns the drive from the engine 29, so that this drive comes into operation when the speed of the rotor tends to fall below the said predetermined speed.

It will be noticed that the engine 29 to which the rotor driving means are coupled is situated on that side of the aircraft on which the blades 14 are retreating or travel in the opposite direction to the direction of motion of the aircraft.

Referring to Fig. 3; c—c indicates the ground line when the aircraft is resting on the tail skid. When the aircraft is in this position it can be seen that the rotor has a very large angle of incidence, thus promoting a very rapid "take off".

The line d—d indicates the ground line when the aircraft is resting on the forward wheel 23. In this position the angle of incidence of the rotor is approximately zero, thus minimizing the danger of the aircraft being blown into the air again after landing and facilitating the stopping of the rotor once the aircraft has landed.

The main wheels 19 are so located that with the aircraft in either of the possible ground positions c—c or d—d, a perpendicular to the ground line drawn through the centre of gravity g of the whole aircraft, lies within the wheel base.

As seen in Fig. 4 the aircraft, after leaving the ground at a very steep ground angle, may immediately assume an even steeper climbing angle, approaching vertical ascent, the automatic propeller-pitch varying mechanism producing at that time a very small pitch angle so as to give maximum thrust at relatively low forward speed of the machine. During such action of the machine, the location and arrangement of the control surfaces provides ample control, by virtue of being almost entirely within the slipstream. Since, at this time, a large proportion of the weight of the machine is taken away from the rotor, and is directly carried by the engine-driven propellers, the rotor would tend to slow down to a point where proper autorotational speed would be lacking when the machine assumed a more horizontal attitude for forward flight, after the steep climb. This possibility of the rotor slowing down below its proper autorotational, sustaining, speed of rotation, is prevented as follows:

Assuming the normal high speed rotation of the crank shafts of the engines, during such climb, to be approximately 2040 R. P. M.; and assuming a rotor designed for normal air-actuated rotation at 170 R. P. M. when sustaining approximately the full weight of the machine; then it will be evident that a gear reduction between the crank shaft 34 of the engine 29, and the rotor hub 39 of the rotor, of approximately 12 to 1, should be employed. These figures are given only by way of illustration, since it will be evident not only that an engine of a different speed might be employed or that a rotor of a different autorotational speed might be used, but also that even with the rotational speeds above given as examples some variation in the gear ratio is permissible, since it is not essential that the engine 29 should (at its top speed during climb) maintain the rotor at its top autorotational speed. It is only necessary that the ratio be such as to prevent excessive or dangerous slowing down of the rotor, so that when the machine assumes a position or condition when the major load of the machine again comes upon the rotor, pure autorotational action of the rotor will continue its rotation, without risk of excessive "coning" or folding-up of the rotor under the full weight of the machine. For instance, if the drive connections be proportioned to maintain (in the example given) a minimum rotor speed of 150 R. P. M., then the resumption of normal attitude of the craft, with resultant normal load on the rotor, will simply cause the rotor to speed up aerodynamically to its normal speed of 170 R. P. M., the device 40 permitting the rotor to over-run the drive from the engine 29.

It may here be noted that even at minimum speed of forward advancement, as in a steep climb, there is considerable autorotational effort induced in the rotor, so that the amount of power delivered through the mechanical driving connections even in a steep climb is a relatively small proportion of the total power of the one connected engine. Thus the uncontrollable reactive torque effect, such as is produced in a helicopter with its high-pitch direct-lifting propeller and high-powered drive thereto, is not involved in the present construction.

The relatively small reactive torque which is produced herein, acts, as before indicated, to turn the body of the machine counterclockwise (viewed in plan, Fig. 1); but its effect is substantially nullified, in direct proportion to the amount of power at any moment being delivered through the drive to the rotor, by virtue of the fact that the engine which delivers a part of its power to the rotor in such a flight operation delivers a proportionately smaller amount of power to the propeller on that side of the machine. In co-operation with this, if the reactive torque in the body of the machine, during such flight condition, does not exactly balance the resultant difference in the pull of the two airscrews, any remaining undesirable tendency of the fuselage to turn is overcome by the instinctive action of the pilot in his use of the normal control surfaces, substantially the whole area of which is in the slipstream of the airscrews.

Rotor torque (at moments when rotor R. P. M. is being mechanically maintained) is thus balanced out; while propeller torque, as hereinbefore indicated, is balanced by employing oppositely rotating engines.

*Advantages of operation*

In take-off, or any equivalent operation or manoeuver, performance and angles of climb approaching those theoretically associated with the helicopter, are feasible with my improved machine, but without loss of stability and control, which defects have been so troublesome in helicopter experimentation (the manner of take-off and climb moreover being distinctive to this machine as indicated in Fig. 4). In maintaining sustained flight or gaining altitude at forward speeds which are vanishingly small, adequate control is had. Under any of these conditions, rotor speed is automatically kept at or near the normal autorotational range.

In forward flight, high-speed operation characteristic of the fixed-wing airplane is obtainable with my improved machine, as well as low-speed operation, but without the dangers of stall or spin which are ever latently present in the airplane.

In vertical descent, or gliding flight, all the advantages peculiar only to the freely-rotative-wing aircraft are retained.

I claim:—

1. In an aircraft, a sustaining rotor including a normally freely-rotative common axis and wing means flexibly arranged thereon for actuation by relative air-flow, at each side of the craft an engine and propulsive airscrew, and driving connections to said rotor from only one of said engines whereby to vary automatically the relative propulsive effect of the two airscrews when the rotor is being driven.

2. In an aircraft, a sustaining rotor including a normally freely-rotative common axis and wing means flexibly arranged thereon for actuation by relative air-flow, a pair of propulsive airscrews, one at each side of the craft, engine means for actuating said airscrews, and driving connections extending to said rotor from the engine means, said driving connections including means so constructed and arranged as to vary the relative propulsive power of the two airscrews substantially in proportion to the driving power delivered to the rotor.

3. In an aircraft, a sustaining rotor including a normally freely-rotative common axis and wing means flexibly arranged thereon for actuation by relative air-flow, a pair of propulsive airscrews, one at each side of the craft, engine means for actuating said airscrews, driving connections extending to said rotor from the engine means, said driving connections including means so constructed and arranged as to vary the relative propulsive power of the two airscrews substantially in proportion to the driving power delivered to the rotor, and a free-wheel device in the driving connections, whereby the rotor may over-run the drive of said connections under the influence of relative air-flow.

4. In an aircraft including a normally wind-driven sustaining rotor of the type referred to, forward propelling means and auxiliary rotor driving means adapted to apply power from the propelling means to supplement the action of the wind in driving the rotor when the rotational speed of the rotor tends to fall below a predetermined minimum, means for automatically counteracting the major part of the reaction set up in the aircraft by the power drive to the rotor, and at least two lateral propulsive airscrews situated one on either side of the craft together with movable control surfaces comprising ailerons, elevator and rudder, the whole being so arranged that the major part of all such control surfaces lies within the slip-stream from one or other of the lateral airscrews, and said rudder being located centrally, with the axes of the lateral airscrews being arranged to converge rearwardly so as to direct the slip-streams therefrom onto the rudder.

5. In an aircraft including a normally wind-driven sustaining rotor of the type referred to, forward propelling means and auxiliary rotor driving means adapted to apply power from the propelling means to supplement the action of the wind in driving the rotor when the rotational speed of the rotor tends to fall below a predetermined minimum, at least two lateral propulsive airscrews situated one on either side of the craft, and movable control surfaces comprising ailerons, elevator and rudder, the whole being so arranged that the major part of all such control surfaces lies within the slip-stream from one or other of the lateral airscrews, and a separate engine for each airscrew, the auxiliary drive for the rotor being coupled only to the engine driving the airscrew on the side of the aircraft on which the rotor blades move in the direction opposite to the direction of motion of the aircraft.

6. In an aircraft including a normally wind-driven sustaining rotor of the type referred to, forward propelling means and auxiliary rotor driving means adapted to apply power from the propelling means to supplement the action of the wind in driving the rotor when the rotational speed of the rotor tends to fall below a predetermined minimum, at least two lateral propulsive airscrews situated one on either side of the craft, and movable control surfaces comprising ailerons, elevator and rudder, the whole being so arranged that the major part of all such control surfaces lies within the slip-stream from one or other of the lateral airscrews, and a separate engine for each airscrew, the auxiliary drive for the rotor being coupled only to the engine driving the airscrew on the side of the aircraft on which the rotor blades move in the direction opposite to the direction of motion of the aircraft, the pitch of the lateral airscrews being variable in flight, and the range of pitch variation being such that said airscrews may develop the maximum efficiency in high speed or cruising flight as well as the maximum thrust at zero advance.

7. In an aircraft, a sustaining rotor including a normally freely-rotative common axis and wing means flexibly arranged thereon for actuation by relative air-flow, means providing for support of the craft in a position of equilibrium with the rotor generally horizontal and further providing for steep take-off angles for the craft, forward-propulsion means including an engine and a variable-pitch propeller for steep-angled climb, means for driving the rotor during steep-angled climb of the craft on said propulsion means, and means for automatically counteracting the major part of the reaction set up in the aircraft by the power drive to the rotor.

8. In an aircraft, a sustaining rotor including a normally freely-rotative common axis and wing means flexibly arranged thereon for actuation by relative air-flow, means providing for support of the craft in a position of equilibrium with the rotor generally horizontal and further providing for steep take-off angles for the craft, forward-propulsion means including an engine and propeller, driving means from said engine to the rotor, an over-running device whereby the rotor may over-run the driving action of the engine under the influence of relative air-flow, and means operative upon engagement of the driving connection to counteract the reactive torque.

9. In an aircraft, a sustaining rotor including a normally freely-rotative common axis and wing means flexibly arranged thereon for actuation by relative air-flow, means providing for support of the craft in a position of equilibrium with the rotor generally horizontal and further providing for steep take-off angles for the craft, forward-propulsion means including an engine and a variable-pitch propeller for steep climb, driving means, including an over-running device, interconnecting said engine and the rotor, and means operative upon engagement of the driving connection to counteract the reactive torque.

10. In an aircraft, a sustaining rotor including a normally freely-rotative common axis and wing means flexibly arranged thereon for actuation by relative air-flow, at each side of the craft a fixed wing with an engine and propulsive airscrew mounted thereon, supporting elements for the craft positioned laterally beneath each fixed wing, and interconnections between said fixed wings, said elements and the body of the craft and connected to the fixed wings adjacent said engines, the engines and rotor providing respectively for nearly vertical ascent and descent, the interconnections from said elements to said fixed wings being yielding and of subtantial height to accommodate such operation, means for driving the rotor during steep-angled climb of the craft on said propellers, and means for simultaneously automatically varying the relative propulsive effect of said propellers.

11. In an aircraft, a sustaining rotor including a normally freely-rotative common axis and wing means flexibly arranged thereon for actuation by relative air-flow, at each side of the craft a fixed wing with an engine and propulsive airscrew mounted thereon, supporting elements for the craft positioned laterally beneath each fixed wing, and interconnections between said fixed wings, said elements and the body of the craft and connected to the fixed wings adjacent said engines, other supporting elements so positioned longitudinally of the craft as to provide for positioning it either generally horizontally or at a steep angle for take-off, said rotor providing for vertical descent of the craft, and said engines being capable of effecting sharp ascent from a steep take-off angle, driving means from one engine to the rotor to ensure the maintenance of a predetermined rotor speed during take-off, and means for automatically counteracting reactive torque set up in the aircraft by the power drive to the rotor.

12. In an aircraft, a sustaining rotor including a normally freely-rotative common axis and wing means flexibly arranged thereon for actuation by relative air-flow, at each side of the craft an engine and propulsive airscrew, and driving connections to said rotor from only one of said engines, at that side of the aircraft at which the rotor blades are travelling rearwardly with respect to the line of flight.

13. In an aircraft, a sustaining rotor including a normally freely-rotative common axis and wing means flexibly arranged thereon for actuation by relative air-flow, at each side of the craft an engine and propulsive airscrew, and driving connections to said rotor from only one of said engines, at that side of the aircraft at which the rotor blades are travelling rearwardly with respect to the line of flight, and control surfaces for the aircraft located in large part within the direct influence of the slip-stream from the propulsive airscrews.

14. In an aircraft, the combination of a sustaining rotor including a freely rotative upright hub and a plurality of wings pivotally mounted thereon and positioned to be normally aerodynamically turned by the relative air-flow in flight, a pair of engines and propulsive airscrews one on each side of the craft, arranged to rotate in opposite directions so as to substantially balance out the engine torque, and a driving connection including an overrunning device, extending to the rotor from that engine only which is on the side of the craft where the rotary wings normally move rearwardly with respect to the forward flight path, whereby to substantially balance out automatically, the rotor torque set up by engagement of the drive thereto, during steep-angled climb of the craft.

15. In an aircraft, a normally wind-driven sustaining rotor, at least two laterally positioned air-screws situated one on either side of the craft, propulsion means including an engine for each airscrew normally operable independently of each other in driving the respective airscrews associated therewith, auxiliary rotor driving means adapted to apply power from the propulsion means to supplement the action of the wind when the rotational speed of the rotor tends to fall below a predetermined minimum, means for automatically counteracting the major part of the reaction set up in the aircraft by the power drive to the rotor, and movable control surfaces comprising ailerons, elevator and rudder, the whole being so arranged that the major part of all such control surfaces lies within the slip-stream from one or the other of the lateral air-screws.

16. In an aircraft including a normally wind-driven sustaining rotor, forward propelling means and auxiliary rotor driving means adapted to apply power from the propelling means to supplement the action of the wind in driving the rotor when the rotational speed of the rotor tends to fall below a predetermined minimum, at least two lateral propulsive airscrews situated one on either side of the craft together with movable control surfaces comprising ailerons, elevator and rudder, the whole being so arranged that the major part of all such control surfaces lies within the slip-stream from one or other of the lateral airscrews, the pitch of the lateral airscrews being variable in flight, and the range of pitch variation being such that said airscrews may develop the maximum thrust at zero advance, and automatic means, independent of the pitch varying means for varying the relative propulsive effect of the two airscrews to counteract torque of the rotor drive.

17. In an aircraft, a sustaining rotor including a normally freely-rotative common axis and wing means flexibly arranged thereon for actuation by relative air-flow, at least two propellers of relatively large diameter located closely adjacent the fuselage and the rotor axis whereby ample clearance with respect to the flexibly-mounted wings is provided, at least two engines normally operable independently of each other in separately driving the several propellers, means for driving the rotor during steep-angled climb of the craft on said propellers, and means for simultaneously automatically varying the relative propulsive effect of said propellers.

18. In an aircraft, a sustaining rotor including a normally freely-rotative common axis and wing means flexibly arranged thereon for actuation by relative air-flow, at least two variable-pitch propellers located closely adjacent the fuselage and the rotor axis whereby ample clearance with respect to the flexibly-mounted wings is provided, independently operable engine means for each propeller, and mechanism for driving the rotor to prevent excessive slowing-down thereof during steep-angled climb of the craft on said propellers, said driving mechanism incorporating means automatically operative under the influence of rotor drive operation for simultaneously varying the relative propulsive effect of said propellers.

19. In an aircraft, a sustaining rotor including a normally freely-rotative common axis and wing means flexibly arranged thereon for actuation by relative air-flow, engine means for forward propulsion, at least two propellers geared-down from the engine means for steep-angled climb and having their axes passing at different sides of the rotor axis, a free-wheel driving connection from the engine means to the rotor by which to avoid excessive slowing-down of the latter during such climb, and means for varying the relative propulsive effect of said propellers which is mechanically operative directly by, and in accordance with the torque delivered through, the driving connection.

20. In an aircraft including a normally wind-driven sustaining rotor, forward propelling means and auxiliary rotor driving means adapted to apply power from the propelling means to supplement the action of the wind in driving the rotor when the rotational speed of the rotor tends to fall below a predetermined minimum, at least two lateral propulsive airscrews situated one on either side of the craft, the pitch of the lateral airscrews being variable in flight, and the range of pitch variation being such that said airscrews may develop the maximum efficiency in high speed or cruising flight as well as the maximum thrust at zero advance, and automatic means, independent of the pitch varying means, for varying the relative propulsive effect of the two airscrews to counteract torque of the rotor drive.

21. In an aircraft, a normally wind-driven sustaining rotor, at least two laterally positioned airscrews situated one on either side of the craft, propulsion means including an engine for each airscrew normally operable independently of each other in driving the respective airscrews associated therewith, auxiliary rotor driving means adapted to apply power from one of said engines to supplement the action of the wind when the rotational speed of the rotor tends to fall below a predetermined minimum, and for automatically counteracting the major part of the reaction set up in the aircraft by the power drive to the rotor, and an overrunning clutch device in the rotor driving means providing for normally free autorotative actuation of the rotor.

22. In an aircraft, the combination of a sustaining rotor including a freely rotative upright hub and a plurality of wings pivotally mounted thereon and positioned to be normally aerodynamically turned by the relative air-flow in flight, a pair of engines and propulsive airscrews one on each side of the craft, and a driving connection including an overrunning device, extending to the rotor from that engine only which is on the side of the craft where the rotary wings normally move rearwardly with respect to the forward flight path, whereby to substantially balance out, automatically, the rotor torque set up by engagement of the drive thereto, during steep-angled climb of the craft.

JUAN DE LA CIERVA.